A. HENNING.
SINGLE DIAPHRAGM GAS METER.
APPLICATION FILED MAR. 11, 1909.
952,806.
Patented Mar. 22, 1910.
3 SHEETS—SHEET 1.
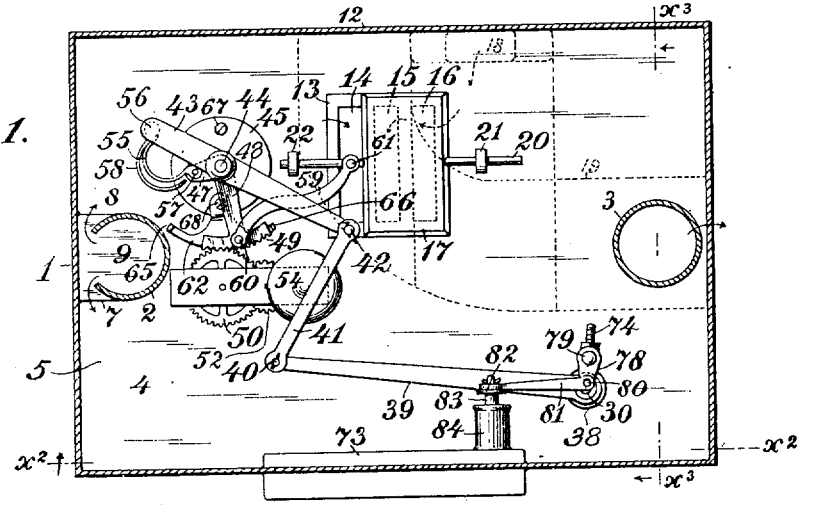
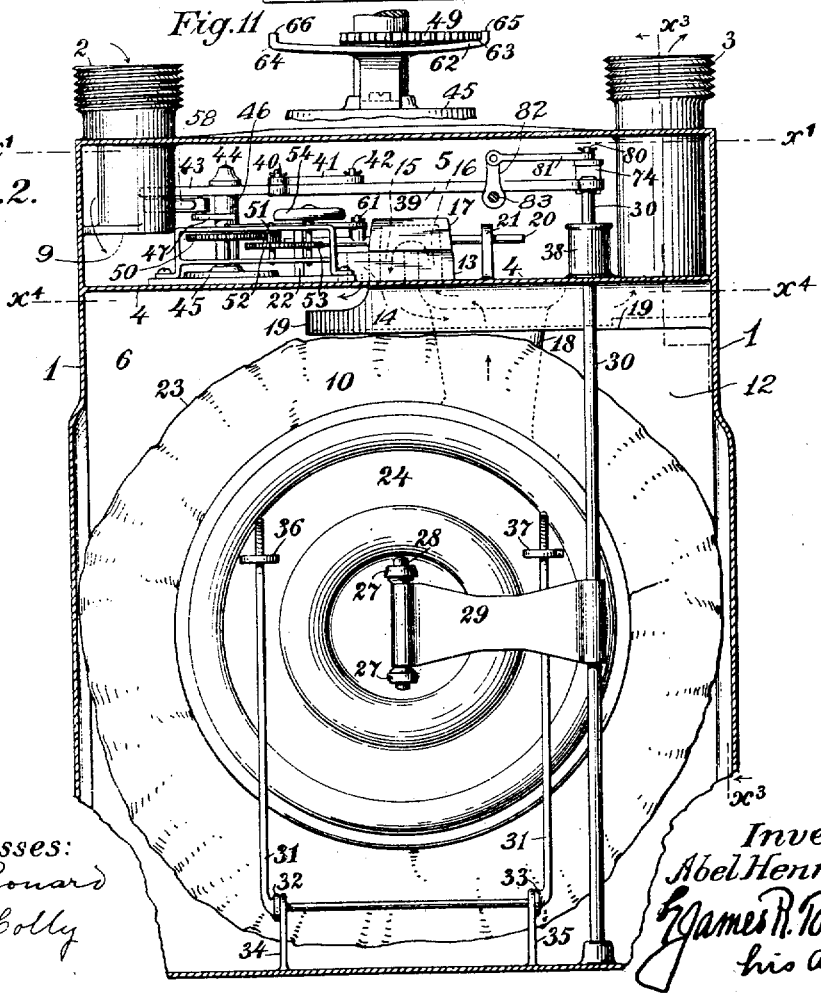
Witnesses:
S. N. Leonard
C. C. Holly
Inventor
Abel Henning
James R. Townsend
his atty.

A. HENNING.
SINGLE DIAPHRAGM GAS METER.
APPLICATION FILED MAR. 11, 1909.
952,806.
Patented Mar. 22, 1910.
3 SHEETS—SHEET 2.
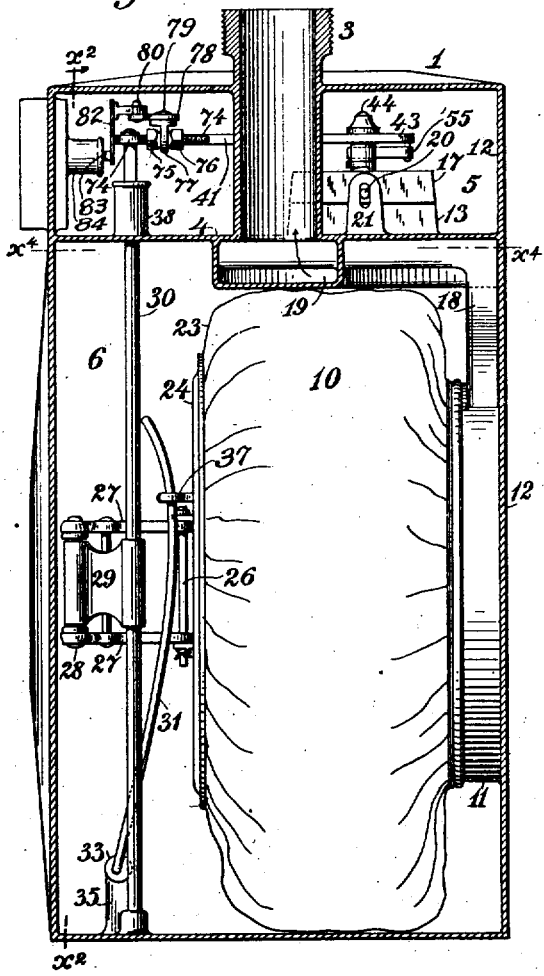
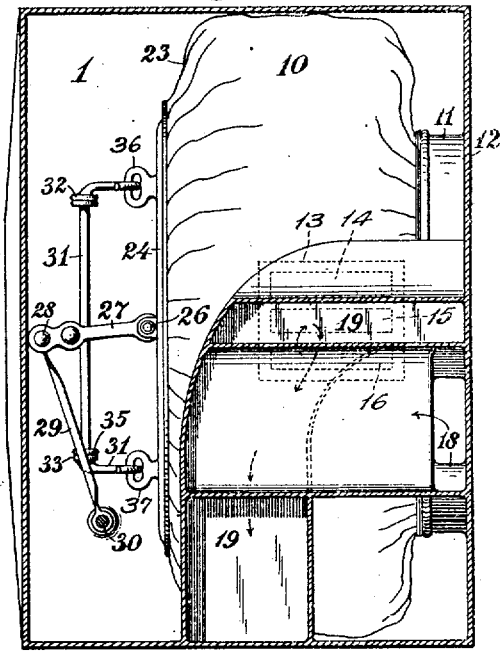
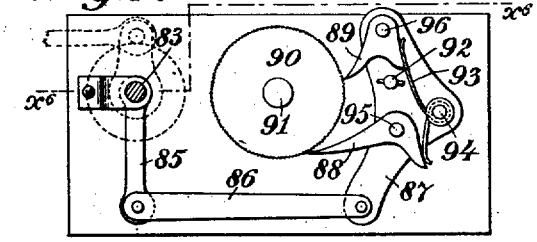
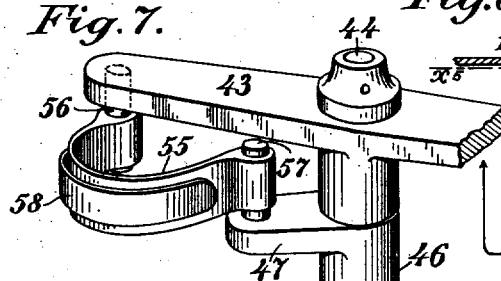
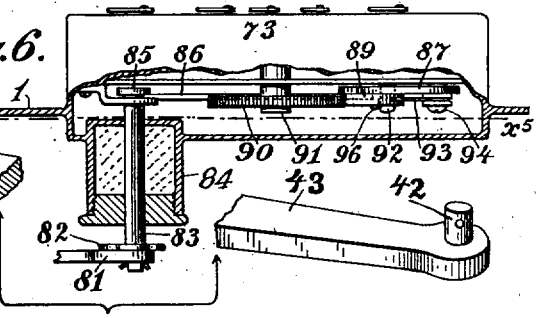
Witnesses:
L. N. Leonard
C. C. Holly
Inventor
Abel Henning
by James R. Townsend
his Atty.

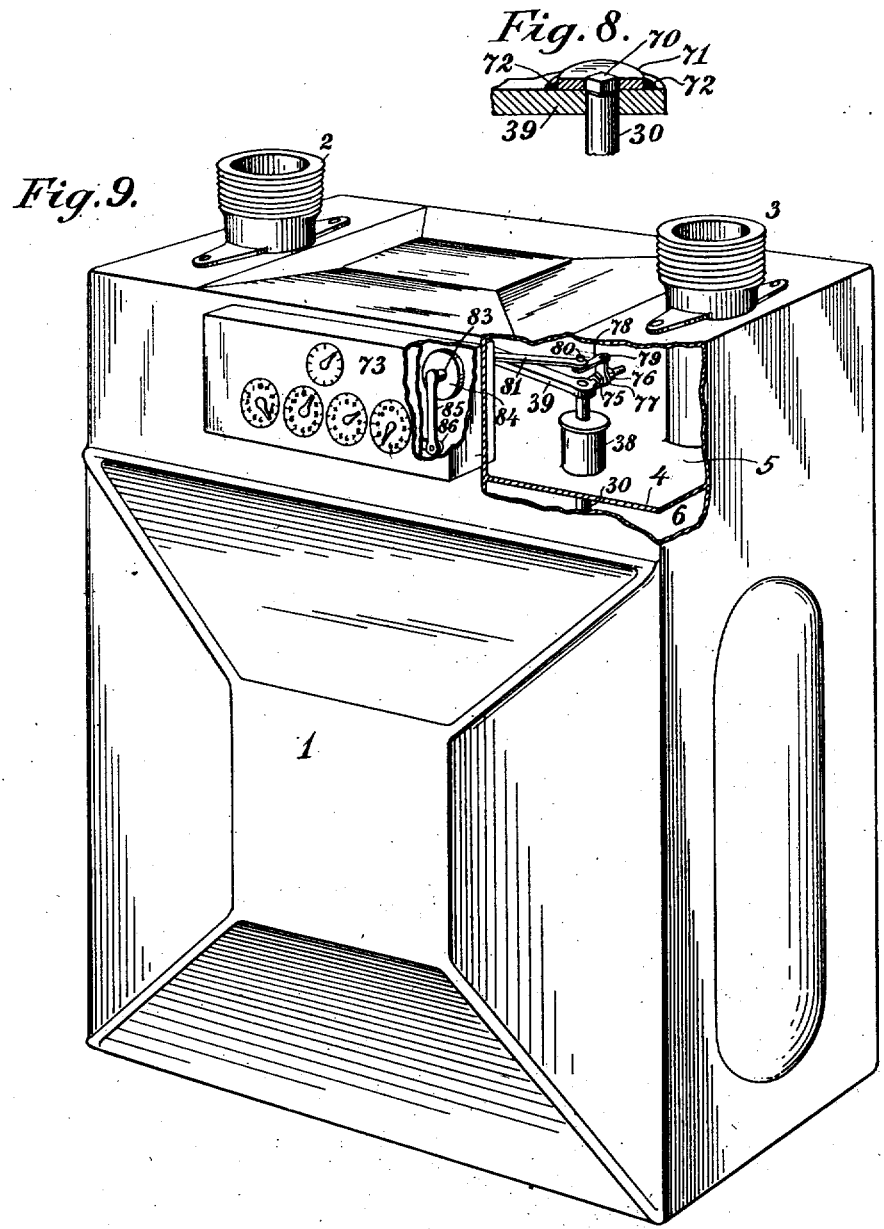

UNITED STATES PATENT OFFICE.

ABEL HENNING, OF LOS ANGELES, CALIFORNIA, ASSIGNOR, BY MESNE ASSIGNMENTS, TO LOS ANGELES METER COMPANY, OF LOS-ANGELES, CALIFORNIA, A CORPORATION OF CALIFORNIA.

SINGLE-DIAPHRAGM GAS-METER.

952,806.

Specification of Letters Patent.   Patented Mar. 22, 1910.

Application filed March 11, 1909.   Serial No. 482,850.

*To all whom it may concern:*

Be it known that I, ABEL HENNING, a citizen of the United States, residing at Los Angeles, in the county of Los Angeles and State of California, have invented a new and useful Single-Diaphragm Gas-Meter, of which the following is a specification.

The object of this invention is to produce a gas meter having a minimum number of parts and maximum capacity for measuring gas, and also being less liable to get out of repair and being more readily and more cheaply repaired than former meters.

The meter is adapted to be incased in the ordinary so-called square tin meter case of the common type of so-called tin meter, the case of a five-light meter of the old type being of sufficient size for a twenty-light meter of this type; that is to say, the capacity of a meter constructed in accordance with this invention is more than four times that of a meter of the old type. At the same time the cost of constructing such twenty-light meter is not greater than the cost of constructing a three-light meter of the old type.

Other objects and various advantages may appear from the subjoined detailed description.

The invention may be constructed in various forms without departing from the spirit of the invention.

The accompanying drawings illustrate the invention.

Figure 1 is a sectional plan viewed from line $x^1$, Fig. 2. Fig. 2 is a front sectional elevation showing the operative parts of the meter, the front face of the case being removed. The view is from line $x^2$, Fig. 3. Fig. 3 is a sectional elevation viewed from line $x^3$, Figs. 1 and 2, looking to the left. Fig. 4 is a sectional plan from line $x^4$, Figs. 2 and 3. Fig. 5 is an elevation from line $x^5$, Fig. 6. Fig. 6 is a plan partly in section from line $x^6$, Fig. 5. Fig. 7 is a broken fragmental perspective detail of the reversing mechanism. Fig. 8 is a sectional perspective detail of the connection between the flag-wire and the reversing lever. Fig. 9 is a perspective view of the meter, a portion of the case being broken away to expose the connection between the flag-wire and other parts. Fig. 10 is a kinematic diagram of the reversing apparatus. Fig. 11, Sheet 1, is a detail of the valve check segment and its check-springs.

The case 1 of the meter may be of any desired construction and material, and is sealed throughout except at the inlet-pipe 2 and outlet-pipe 3, and is divided interiorly by a gallery-plate 4 into the inlet-chamber 5 and the diaphragm-chamber 6. The inlet-pipe 2 opens into the inlet-chamber 5 through two ports 7, 8, above the gallery-plate 4; the lower end of said pipe below said ports 7 and 8 being closed by a floor 9. The ports 7 and 8 are between the body of the pipe 2 and a wall of the case 1, and are so arranged as to prevent tampering with the mechanism of the meter by means of any instrument inserted through the inlet-pipe 2.

The meter is provided with only one diaphragm 10 which is of the same construction as the diaphragm of an ordinary two-diaphragm meter, the difference being that the diaphragm-ring 11 is soldered to the back wall 12 of the case instead of to a partition as is the case with the ordinary square two-diaphragm meter.

The gallery-plate 4 is provided with a valve-seat 13 having three ports 14, 15 and 16; on which seat is mounted a hollow valve-slide or cover 17 capable of simultaneously covering and connecting either the ports 14 and 15 or the ports 15 and 16. The port 14 communicates between the inlet-chamber 5 and the diaphragm-chamber 6 so as to deliver gas to the outside of the diaphragm which is inside said chamber 6. The port 16 communicates between the inlet-chamber 5 and the inside of the diaphragm 10 through pipe 18. The port 15 communicates through pipe 19 with the outlet-pipe 3. The valve-slide 17 is mounted on a rod 20 carried by bearings 21, 22; all of which is customary with the former two-diaphragm meter, excepting, however, that there is more leather in the flexible walls 23 of the diaphragm 10 than has heretofore been usual with diaphragms of like diameter, thus to allow the diaphragm-disk 24 to oscillate with greater amplitude toward and from the diaphragm-ring 11 so that more gas is discharged at each oscillation.

The diaphragm-disk 24 is connected by a pivot 26 with a connecting link 27 which is hinged at 28 to an arm 29 of the flag-wire 30 so that the connection between the diaphragm and the flag-wire is doubly jointed or hinged, thus to allow greater extension of the diaphragm; the disk moving in a straight path back and forth. The flag-wire is pivoted at its upper and lower ends in the usual manner so as to oscillate in response to the movement of the diaphragm-disk.

The U-shaped disk-guide-wire 31 is provided with two rigid collars 32 and 33 to bear against the guide-wire-posts 34, 35, so that the arms of the guide-wire 31 which pass through the disk-guides 36, 37, will be held true and will prevent the disk from moving edgewise so that the disk is always held truly centered.

The flag-wire 30 is connected with the valve-slide 17 by mechanism adapted to move the valve from one to the other side of the valve-seat 13 and vice versa at the close of the movements of the diaphragm-disk in one and the other direction. The flag-wire 30 extends from the diaphragm-chamber 6 through a stuffing-box 38 into the inlet-chamber 5, and is there provided with a flag-wire-arm 39 which is connected by a pivot 40 with the flag-wire-arm-link 41 which in turn is pivoted by a pivot 42 to one arm of a spring-operating lever 43, which is swiveled on a post 44 provided at its base with a flange 45 which is fixed by suitable means to the gallery-plate 4.

A bell crank lever 46 is swiveled on the post 44 and is provided with two arms 47, 48, the latter of which is provided with a toothed segment 49 adapted to engage a gear 50 of a train 51, 52, 53, by which a balance-wheel 54 is driven at each operation of the diaphragm in either direction. A loop-spring 55 is connected at one end by a pivot 56 to one arm of the lever 43, and is connected by a pivot 57 with the outer arm 47 of the bell crank 46.

58 is a rigid guard rigidly connected at one end with one end of the spring 55 and extending around said spring to be engaged thereby when the spring has exerted sufficient force to operate the valve; a part of such force being stored up in the balance-wheel through the train.

The segment 49 is connected with the valve-rod 20 by a link 59 that is pivoted to the segment by a pivot 60 and to the valve-rod by a pivot 61. The rigid spring-guard 58 serves in a measure as a stop for the valve.

62 is a spring for limiting the movement of the segment, and consequently also serving as a stop for the valve. This spring 62 is arranged beneath the segment 49 and is bowed upward aslant at its ends as shown at 63 and 64 in Fig. 11, across the paths of the ends of the segment 49 so that as the segment passes over the middle of the spring it is free to move without impediment from the spring and also without impediment from the spring-guard 58, but as it approaches the end of its movement it engages one or the other of the slanting spring surfaces 63 and 64 and is thereby impeded, pressing the spring surface thus engaged downward as the segment moves onward toward the close of the movement of the valve. Said spring 62 is provided at its ends with stops 65 and 66 to positively intercept the segment and stop its movement in one and the other direction when the valve has come into position in the one instance to uncover the port 14 and connect the ports 15 and 16 with each other and separate them from the inlet-chamber 6; and in the other instance, to uncover the port 16 and connect ports 14 and 15 with each other and separate them from the inlet-chamber 6.

The levers 43 and 46 and the pivots 56 and 57 are so located relative to each other that when the lever 43 is at rest in the position to which the flag-wire-arm 39 moves at the close of the movement of the diaphragm-disk in one or the other direction, a line drawn from the pivotal point 56 to the center of the post 44 will be at one side of the pivot 57 that connects the valve-operating spring 55 and the arm 47, so that the tendency of the spring will then be to force the segment in one direction, and when the lever 43 is swung to the other side by the flag-wire 30 on the reverse movement of the diaphragm-disk, the pivotal point 56 is swung beyond a produced straight line drawn through the pivot 57 and the center of the post 44, and the tension of the spring 55 will be exerted to move the segment in the other direction. This will be understood by reference to the diagrammatic Fig. 10.

In practical operation, when the lever 43 is shifted to bring the pivot 56 across the line that intersects the pivot 57 and post 44, the spring operates to move the segment and thus to move the valve. The tension of the spring at the outset of such movement is greater than at any other time during such movement, and in order to apply the forces satisfactorily to prevent jarring and wavering of the valve the force at first applied by the spring is partially taken up by driving the train of gears and the balance-wheel, and the force thus stored in the balance-wheel is subsequently exerted to carry the segment to the end of its course where it is gradually stopped by engaging the spring 62, and is finally brought to a positive standstill by the stops 65 or 66, as the case may be, at the ends of said spring.

The post 44 may be detachably fastened to the gallery-plate 4 by screws 67, 68, that are screwed through the flange into a plate 69 that may be soldered to the gallery-plate. The screw 68 may also serve to hold the spring 62 in place.

In order to accurately adjust the flag-wirearm 39 relative to the flag-wire 30, the flag-wire is provided at its top with an angular portion 70 to which is fitted a washer 71 that is secured by solder 72 to the flag-wire-arm 39. The washer 71 is provided with an angular hole that fits the angular end of the flag-wire 30 so that the washer is rigid relative to the flag-wire; but so long as it is unsoldered, the flag-wire 39 may be moved freely on the flag-wire. When the flag-wire-arm has been brought to the proper position the washer 71 is soldered fast both to the flag-wire and to the flag-wire-arm. By this arrangement a large soldered surface is provided so that the danger of disconnecting the flag-wire-arm from the flag-wire is minimized.

The flag-wire 30 is adjustably connected with the mechanism of the index 73. This is done by means which shall now be described.

74 is a rigid threaded arm fixed to the flag-wire 30 and may be integral with the flag-wire-arm 39. Between two nuts 75, 76 on the arm 74 is mounted a head 77 having a rigid arm 78 thereon which may be integral therewith or may be fixed thereto by a rivet 79. Said arm is provided with a pivot 80 by which a link 81 is pivoted to the arm. Said link is pivoted to one arm 82 of a rock-shaft 83 that passes through a stuffing-box 84 in the wall of the case to communicate motion through the other arm 85 of the rock-shaft and the index-link 86, index-lever 87, pawls 88, 89, ratchet-wheel 90 and index-shaft 91; said lever 87 being pivoted to the case by the pivot 92, and said pawls being held in engagement with the wheel 90 by a spring 93 carried by the post 94 on said pawl-lever 87 to which the pawls 88 and 89 are pivoted by pivots 95, 96. The pivot 80 of the head 77 is adjustable toward and from the produced axis of the flag-wire 30 by adjusting the nuts 75, 76, on the screw-stem 74. As the pivot 80 moves from said produced axis the motion of the rock-shaft 83 is increased, thus increasing the movement of the index. A reverse movement of the pivot 80 will decrease the movement of the index as the flag-wire turns responsive to the diaphragm. In this manner an accurate adjustment between the diaphragm and the index-mechanism may be secured so that in testing the meter, if it is found that the same registers less than it should the head 77 may be moved away from the flag-wire so that each time the flag-wire turns it will cause a greater movement of the index, and vice versa.

I claim:—

1. In a gas meter, the combination with the flag-wire-arm, of a lever, a link connecting the flag-wire-arm with the lever, mechanism for operating the meter-valve, and a spring forming a connection between said lever and said valve-operating mechanism, said spring being arranged to be placed under tension by the movement of said lever at the close of the movement of the flag-wire-arm to operate said valve in first one and then in the other direction.

2. In a gas meter, the combination with the flag-wire-arm, of a pivoted lever, a link connecting the arm with one end of said lever, a bell-crank, a spring connecting the other end of said lever with one arm of said bell-crank, a valve, a link connecting the other arm of said bell-crank with said valve, the spring forming a flexible connection pivoted to the lever and the bell-crank and arranged to operate the bell-crank in one direction at the close of the movement of the lever in the opposite direction, and vice versa.

3. In a gas meter, the combination with the flag-wire and the meter valve, of yielding means operable by the flag-wire and adapted to operate the valve in one and the other direction at the close of the movement of the flag-wire in one and the other direction respectively, and a balance-wheel operable by said yielding means and adapted to continue the movement of the valve after the yielding means has ceased to act.

4. In a gas meter, the combination with a meter-valve and a pivoted flag-wire, of a lever, means operably connecting the lever with the flag-wire, a spring operable by said lever in first one and then in another direction, means operated by said spring in one and another direction as the lever moves to operate the spring, and a link connecting said spring-operated means with the meter-valve.

5. In a gas meter, the combination with a flag-wire, of a lever connected therewith, a spring operable by said lever in first one and then in another direction, means operated by said spring in one and another direction as the lever moves to operate the same, a link connecting said spring-operated means with the meter-valve, a rack on said spring-operated means, a balance-wheel, and a train of wheels between the rack and the balance-wheel to transmit motion between said rack and the balance-wheel, and vice versa.

6. In a gas meter, a valve, a link to operate the valve, pivoted means to operate the link, means to operate said pivoted means first in one and then the other direction, and a spring to yieldingly stop said pivoted means at the end of its movement in one and the other direction.

7. In a gas meter, a valve, a link to operate the valve, pivoted means to operate the link, means to operate said pivoted means first in one and then the other direction, a spring to yieldingly stop said pivoted means at the end of its movement in one and the other direction, and a balance-wheel operatively connected with said pivoted means to store up power applied thereto and to apply such power to complete the movement for closing the valve in either direction.

8. In a gas meter, the combination of a meter-valve, with a diaphragm to one and the other side of which gas is supplied alternately through said valve, a spring, a link connected with the valve, pivoted means connecting the link and one end of the spring, means operably connecting the other end of the spring with the diaphragm and adapted to move the spring into position to operate said pivoted means in first one and then the other direction thereby to move the valve in one and the other direction, and means for receiving power from said pivoted means at its initial movement in one direction and to apply power thereto at the close of the movement in such direction, and vice versa.

9. In a gas meter, the combination with a meter-valve, of a diaphragm to one and the other side of which gas is supplied alternately, a spring, a link connected with the valve, pivoted means connecting the link and one end of the spring, means operably connecting the other end of the spring with the diaphragm and adapted to move the spring into position to operate said pivoted means in first one and then the other direction thereby to move the valve in one and the other direction, means for receiving power from said pivoted means at its initial movement in one direction and to apply power thereto at the close of the movement in such direction, and vice versa, and yielding means to stop the pivoted means at the end of its movement in one and the other direction.

In testimony whereof, I have hereunto set my hand at Los Angeles, California, this 1st day of March 1909.

ABEL HENNING.

In presence of—
 JAMES R. TOWNSEND,
 WM. SCHRADE.

---

Corrections in Letters Patent No. 952,806.

It is hereby certified that in Letters Patent No. 952,806, granted March 22, 1910, upon the application of Abel Henning, of Los Angeles, California, for an improvement in "Single-Diaphragm Gas-Meters," errors appear in the printed specification requiring correction as follows: Page 1, line 16 before the word "tin" the word *square* should be inserted; page 4, line 6, the word "of" should read *with*, and line 7, the word "with" should read *of*; and the name of the second witness to the signature of the specification should read *Wm. Schade* instead of "Wm. Schrade;" and that the said Letters Patent should be read with these corrections therein that the same may conform to the record of the case in the Patent Office.

Signed and sealed this 10th day of May, A. D., 1910.

[SEAL.]

C. C. BILLINGS,
*Acting Commissioner of Patents.* atively connected with said pivoted means to store up power applied thereto and to apply such power to complete the movement for closing the valve in either direction.

8. In a gas meter, the combination of a meter-valve, with a diaphragm to one and the other side of which gas is supplied alternately through said valve, a spring, a link connected with the valve, pivoted means connecting the link and one end of the spring, means operably connecting the other end of the spring with the diaphragm and adapted to move the spring into position to operate said pivoted means in first one and then the other direction thereby to move the valve in one and the other direction, and means for receiving power from said pivoted means at its initial movement in one direction and to apply power thereto at the close of the movement in such direction, and vice versa.

9. In a gas meter, the combination with a meter-valve, of a diaphragm to one and the other side of which gas is supplied alternately, a spring, a link connected with the valve, pivoted means connecting the link and one end of the spring, means operably connecting the other end of the spring with the diaphragm and adapted to move the spring into position to operate said pivoted means in first one and then the other direction thereby to move the valve in one and the other direction, means for receiving power from said pivoted means at its initial movement in one direction and to apply power thereto at the close of the movement in such direction, and vice versa, and yielding means to stop the pivoted means at the end of its movement in one and the other direction.

In testimony whereof, I have hereunto set my hand at Los Angeles, California, this 1st day of March 1909.

ABEL HENNING.

In presence of—
JAMES R. TOWNSEND,
WM. SCHRADE.

---

Corrections in Letters Patent No. 952,806.

It is hereby certified that in Letters Patent No. 952,806, granted March 22, 1910, upon the application of Abel Henning, of Los Angeles, California, for an improvement in "Single-Diaphragm Gas-Meters," errors appear in the printed specification requiring correction as follows: Page 1, line 16 before the word "tin" the word *square* should be inserted; page 4, line 6, the word "of" should read *with*, and line 7, the word "with" should read *of;* and the name of the second witness to the signature of the specification should read *Wm. Schade* instead of "Wm. Schrade;" and that the said Letters Patent should be read with these corrections therein that the same may conform to the record of the case in the Patent Office.

Signed and sealed this 10th day of May, A. D., 1910.

[SEAL.]

C. C. BILLINGS,
*Acting Commissioner of Patents.*

It is hereby certified that in Letters Patent No. 952,806, granted March 22, 1910, upon the application of Abel Henning, of Los Angeles, California, for an improvement in "Single-Diaphragm Gas-Meters," errors appear in the printed specification requiring correction as follows: Page 1, line 16 before the word "tin" the word *square* should be inserted; page 4, line 6, the word "of" should read *with*, and line 7, the word "with" should read *of;* and the name of the second witness to the signature of the specification should read *Wm. Schade* instead of "Wm. Schrade;" and that the said Letters Patent should be read with these corrections therein that the same may conform to the record of the case in the Patent Office.

Signed and sealed this 10th day of May, A. D., 1910.

[SEAL.]

C. C. BILLINGS,
*Acting Commissioner of Patents.*